(12) United States Patent
Mahdavi

(10) Patent No.: US 7,546,367 B2
(45) Date of Patent: Jun. 9, 2009

(54) METHODS AND SYSTEMS FOR MANAGING NETWORK TRAFFIC BY MULTIPLE CONSTRAINTS

(75) Inventor: Jamshid Mahdavi, San Jose, CA (US)

(73) Assignee: Novell, Inc., Provo, UT (US)

( * ) Notice: Subject to any disclaimer, the term of this patent is extended or adjusted under 35 U.S.C. 154(b) by 1301 days.

(21) Appl. No.: 10/758,327

(22) Filed: Jan. 15, 2004

(65) Prior Publication Data

US 2005/0169173 A1 Aug. 4, 2005

(51) Int. Cl.
*G06F 15/173* (2006.01)
(52) U.S. Cl. .......................... 709/224; 370/230; 370/413
(58) Field of Classification Search .................. 370/230, 370/413; 709/224
See application file for complete search history.

(56) References Cited

U.S. PATENT DOCUMENTS

| | | | |
|---|---|---|---|
| 5,063,562 A | 11/1991 | Barzilai et al. | |
| 5,361,372 A | 11/1994 | Rege et al. | |
| 5,574,934 A | 11/1996 | Mirashrafi et al. | |
| 5,649,110 A | 7/1997 | Ben-Nun et al. | 370/351 |
| 5,864,540 A | 1/1999 | Bonomi et al. | 370/235 |
| 5,870,384 A | 2/1999 | Salovuori et al. | 370/235 |
| 5,926,459 A | 7/1999 | Lyles et al. | 370/230 |
| 6,064,650 A | 5/2000 | Kappler et al. | 370/232 |
| 6,064,651 A | 5/2000 | Rogers et al. | 370/233 |
| 6,185,601 B1 | 2/2001 | Wolff | 709/203 |
| 6,215,769 B1 | 4/2001 | Ghani et al. | |
| 6,310,881 B1 | 10/2001 | Zikan et al. | 370/401 |
| 6,327,622 B1 | 12/2001 | Jindal et al. | 709/228 |
| 6,424,626 B1 | 7/2002 | Kidambi et al. | |
| 6,484,143 B1 | 11/2002 | Swildens et al. | 705/1 |
| 6,499,088 B1 | 12/2002 | Wexler et al. | |
| 6,535,482 B1 | 3/2003 | Hadi et al. | |
| 6,697,378 B1 | 2/2004 | Patel | |
| 6,751,659 B1 | 6/2004 | Fenger et al. | |
| 6,868,439 B2 | 3/2005 | Basu et al. | |
| 6,961,309 B2 | 11/2005 | Carlson et al. | |

(Continued)

FOREIGN PATENT DOCUMENTS

EP        1 303 087 A2    4/2003

OTHER PUBLICATIONS

Floyd, Sally, et al., "Link-sharing and Resource Management Models for Packet Networks", *IEEE/ACM Transactions of Networking*, vol. 3, No. 4., (Aug. 1995),1-22.

(Continued)

*Primary Examiner*—Tonia L Dollinger
*Assistant Examiner*—Kyung H Shin
(74) *Attorney, Agent, or Firm*—Schwegman, Lundberg & Woessner, P.A.

(57) ABSTRACT

Methods and systems for managing network traffic by multiple constraints are provided. A received network packet is assigned to multiple queues where each queue is associated with a different constraint. A network packet traverses the queues once it satisfies the constraint associated with that queue. Once the network packet has traversed all its assigned queues the network packet is forwarded to its destination. Also, network activity, associated with higher priority applications which are not managed, is detected. When such activity is detected, additional constraints are added to the network packet as it traverses its assigned queues.

30 Claims, 3 Drawing Sheets

U.S. PATENT DOCUMENTS

| | | | |
|---|---|---|---|
| 6,961,539 | B2 | 11/2005 | Schweinhart et al. |
| 7,047,312 | B1 | 5/2006 | Aweya et al. |
| 7,225,266 | B2 | 5/2007 | Ameigeiras et al. |
| 7,242,668 | B2 | 7/2007 | Kan et al. |
| 7,283,469 | B2 | 10/2007 | Swami |
| 7,284,047 | B2 | 10/2007 | Barham et al. |
| 7,349,337 | B1 | 3/2008 | Mahdavi |
| 2001/0017844 | A1 | 8/2001 | Mangin |
| 2002/0080721 | A1 | 6/2002 | Tobagi et al. |
| 2002/0103778 | A1 | 8/2002 | Saxena |
| 2002/0107743 | A1 | 8/2002 | Sagawa |
| 2003/0112817 | A1* | 6/2003 | Woo et al. .............. 370/413 |
| 2003/0135639 | A1 | 7/2003 | Marejka et al. |
| 2003/0156588 | A1 | 8/2003 | Elbourne et al. |
| 2004/0064577 | A1 | 4/2004 | Dahlin et al. |
| 2006/0165029 | A1 | 7/2006 | Melpignano et al. |

OTHER PUBLICATIONS

"European Search Report", *Search Report received for EP Application No. 04106294*, (Mar. 2, 2005),3 pgs.

Zhang, H., et al., "Rate-controlled static-priority queueing", *Networking: Foundation for the Future*, San Francisco, Mar. 28-Apr. 1, 1993, *Proceedings of the Annual Joint Conference of the Computer Communications Societies (INFOCOM)*, Los Alamitos, *IEEE Comp. Soc. Press*, US, vol. 2, Conf. 12, (Mar. 28, 1993),227-236.

"U.S. Appl. No. 10/409,529 Response filed Jun. 23, 2008 to Final Office Action mailed Apr. 23, 2008", 15 pgs.

"U.S. Appl. No. 10/409,529 Final Office Action mailed Apr. 23, 2008", 3 pgs.

"U.S. Appl. No. 10/409,529 Non Final Office Action mailed Oct. 15, 2007", 2 pgs.

"U.S. Appl. No. 10/409,529 Response filed Jan. 15, 2008 to Non Final Office Action mailed Oct. 15, 2007", 15 pgs.

"U.S. Appl. No. 10/734,703 Response filed Nov. 7, 2007 in response to Non-Final Office Action mailed Aug. 7, 2007", 9 pgs.

"U.S. Appl. No. 10/734,703 Non Final Office Action mailed Aug. 7, 2007", 9 pgs.

"U.S. Appl. No. 10/734,703 Notice of Allowance mailed Dec. 18, 2007", 5 pgs.

"European Search Report", *Search Report received for EP Application No. 04106294*, (Mar. 2, 2005),4 pgs.

* cited by examiner

METHODS AND SYSTEMS FOR MANAGING NETWORK TRAFFIC BY MULTIPLE CONSTRAINTS

CROSS-REFERENCE TO RELATED APPLICATIONS

The current application is related to co-pending and commonly assigned U.S. application Ser. No. 10/409,529 entitled "Methods and Systems for Managing Network Traffic," filed on Apr. 8, 2003, the disclosure of which is incorporated by reference herein. The current application is also related to commonly assigned U.S. application Ser. No. 10/734,703 entitled "Techniques for Shaping Dating Transmission Rates," filed on Dec. 12, 2003, now issued as U.S. Pat. No. 7,349,337, the disclosure of which is also incorporated by reference herein.

FIELD OF THE INVENTION

The present invention relates to network administration and in particular to techniques for managing traffic associated with multiple constraints.

BACKGROUND OF THE INVENTION

Managing network bandwidth has become increasingly problematic as ever increasing numbers of users transmit voluminous amounts of data and compete for limited resources. A variety of solutions have been adopted to address these problems.

Generally, high performance networks will deploy caching solutions for improving the timely delivery of network data. Caching hardware or software permits data that has been accessed at least once before to remain in memory or storage for some configurable period of time, such that when the data is needed a subsequent time it is immediately available in the cache, assuming the data has not become stale. However, caching alone is not a sufficient solution for today's complex networks, because caching does not address scheduling and does not assist when data is flushed or not initially available from the cache.

As a result, network administrators have augmented traditional caching solutions with a Content Distribution Network (CDN). A CDN is used for more intelligent caching, scheduling, and routing of data. A CDN makes determinations about what type of data is frequently accessed and acquires that data in cache before any request is made for that data. Thus, a CDN makes frequently accessed data available to a first requestor and provides continual service to that data via the cache. A CDN also provides intelligent routing and scheduling of data over a network.

However, some CDNs suffer from the inability to communicate priorities or manage priorities in an integrated fashion with other traffic that is not being managed by the CDNs. As a result, non CDN activity can unduly suffer in a network which deploys a CDN. Recent advances developed by Novell Inc. of Provo, Utah have addressed this problem by integrating CDN priorities with other non-CDN network applications.

As a practical matter, priorities can include the enforcement of a variety of constraints which form multiple dependencies. Thus, priorities themselves are not linear but often can be hierarchical. For example, within an organization each group may be assigned a network traffic priority, but within each group there may be other constraints such as time of day that resources or data are needed or specific data delivery rates which are required for certain applications to operate properly. Moreover, a group may be physically dispersed across multiple sites and each site may have its own constraints, such as a defined bandwidth limit and the like. Thus, priorities can include multiple dependencies associated with multiple constraint policies.

Additionally, because a variety of applications manage network traffic any single solution will not have control over all traffic. For example, a CDN may not be capable of controlling an enterprise-wide email system. Thus, the CDN cannot directly control the network bandwidth of the email system, but the CDN can indirectly adversely impact the bandwidth available to the email system if the CDN is not aware of the email system. Thus, network traffic management solutions should be aware of important traffic over which it has not control.

Furthermore, it is advantageous for any adopted network traffic management solution to be capable of controlling the transmission rates of senders to the network based on the priorities, constraints, and applications being managed. This capability would permit a network traffic management solution to better manage network traffic, since undesirable traffic can be partially controlled and will not have to be processed at transmission rates which are not desired based on existing priorities.

Thus, there is a need for a network traffic management solution that manages traffic based on multiple constraints associated with multiple priorities and that further assists in controlling the transmission rates of data being received from senders of a network.

SUMMARY OF THE INVENTION

In various embodiments of the present invention, techniques for managing network traffic via multiple constraints are described. A receiver or receiver of a network packet assigns the packet when received to a plurality of queues, where each queue is associated with a different constraint. As the constraints for each queue are satisfied, the network packet traverses through the queues. Once a last queue is traversed, an acknowledgment is sent to an original sender of the network packet or the network packet is forwarded to a receiver. Moreover, as the network packet is being managed, network activity associated with non managed traffic and higher priority applications is monitored. If the management of the network packet impacts the activity of the higher priority applications, then additional constraints are added to the management of the network packet.

More specifically and in one embodiment of the present invention, a method for managing network traffic by multiple constraints is presented. Constraints are identified and associated with a network packet. Next, the network packet is assigned to a plurality of queues. Then, the network packet is forwarded to a first one of the queues. The network packet is released to each successive queue as a number of the constraints are satisfied.

In another embodiment of the present invention, another method for managing network traffic by multiple constraints is provided. A network packet is managed using multiple constraints. Concurrently, network activity not being managed is detected. This network activity is identified as being associated with a higher priority application. Accordingly, a new constraint is added for managing the network packet as long as the network activity remains at a higher priority.

In still another embodiment of the present invention, a system for managing network traffic by multiple constraints is described. The system includes a plurality of queues and a queue manager. Each queue is associated with a separate constraint. The queue manager assembles sets of the queues into hierarchies for received network packets based on identities associated with the network packets. Moreover, the packets traverse the hierarchies after satisfying the constraints of the queues and once traversed once traversed the network packets are forward to their destinations.

In yet another embodiment of the present invention, a system for managing network traffic by multiple constraints is presented. The system includes a traffic manager, configuration policies, and listening applications. The traffic manager manages network packets via multiple constraints. The configuration policies are used for identifying higher priority applications that generate network traffic which is not controlled by the traffic manager. The configuration policies include actions for the traffic manager to take when the higher priority applications are active. The listening applications listen for activity of the higher priority applications associated with the configuration policies and notify the traffic manager when activity is detected.

Still other aspects of the present invention will become apparent to those of ordinary skill in the art from the following description of various embodiments. As will be realized the invention is capable of other embodiments, all without departing from the present invention. Accordingly, the drawings and descriptions are illustrative in nature and not intended to be restrictive.

DETAILED DESCRIPTION OF THE INVENTION

Figure 1:
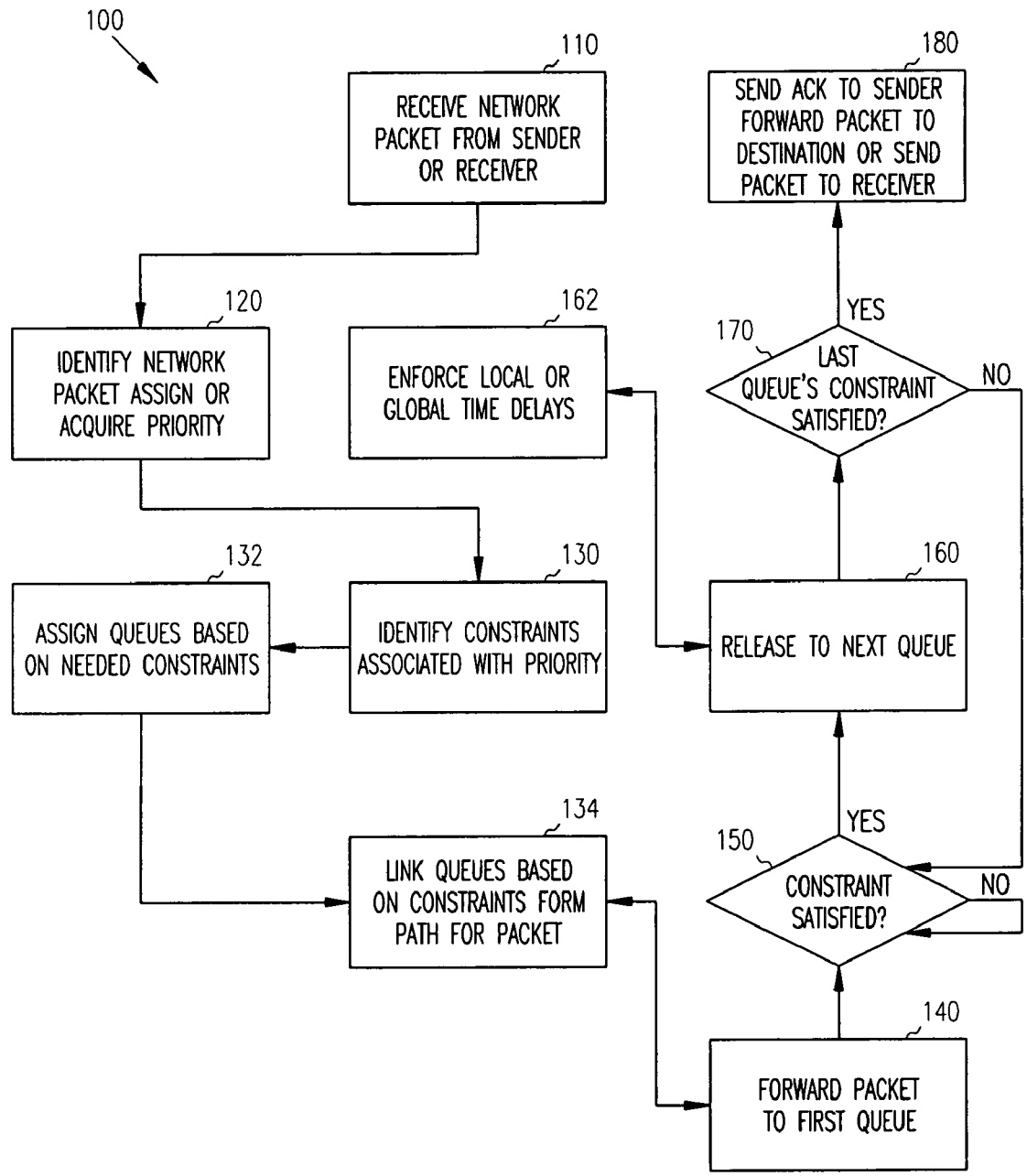
FIG. 1 is a flowchart representing a method for managing network traffic by multiple constraints.

In the following description, reference is made to the accompanying drawings that form a part hereof, and in which is shown by way of illustration specific embodiments in which the invention may be practiced. These embodiments are described in sufficient detail to enable one of ordinary skill in the art to practice the invention, and it is to be understood that other embodiments may be utilized and that structural, logical, optical, and electrical changes may be made without departing from the scope of the present invention. The following description is, therefore, not to be taken in a limited sense, and the scope of the present invention is defined by the appended claims.

In various embodiments of the present invention, a priority identifies on a predefined scale the importance of a network packet. For example, assuming a scale of A to Z, a packet with a priority assignment of A is more important than a packet with a priority assignment of B. Any non-numeric or numeric scale can be used for purposes of defining a priority scale. Moreover, non-numeric and numeric can be combined to form a priority scheme. For example, email priority traffic may be assigned priorities of A1-A10, while a different type of traffic such as World-Wide Web (WWW) Internet traffic may be assigned priorities of B1-B10.

Additionally, it may be the case that the actual priority changes as needed. For example, assume during the normal business hours that email traffic is to receive a higher priority than WWW Internet traffic; however, after normal business hours the WWW Internet traffic is to a higher priority than the email traffic.

A network packet is one or more blocks of data being routed through a network. Network packets are sent from senders to receivers over the network.

The designation of a sender and a receiver can change depending upon the action being performed with any given network transaction. Thus, when data is being sent through a network the transmitter of that data is a sender and when data is being received through the network the entity receiving that data is a receiver.

Network packets use, consume, and are directed to specific network resources controlled by the receiver. A network resource includes hardware devices (e.g., servers, routers, gateways, proxies, firewalls, peripherals, processing devices, network ports, hubs, bridges, Local Area Network (LAN) connections, Wide Area Network (WAN) connections etc.) or software applications that logically represent a resource (e.g., an application, a protocol, a user, a group, an entity, a custom data structure, etc.).

Constraints are limitations that affect the routing of a network packet through the receiver's and sender's network. A single priority is mapped to and associated with multiple constraints. Constraints can be resource based, time based, or bandwidth based. The constraints map to logic which controls the flow of a network packet through a receiver's network. Constraints can be configured based on the needs of any particular network and its traffic patterns. Each distinct constraint is associated with a queue.

A queue is an intermediate location for a network packet as it traverses through the receiver's or sender's network to its final destination. Although, the term queue is used for purposes of illustration throughout this disclosure, it is to be understood that any data structure can be used for purposes of creating a temporary and intermediate storage location for a network packet that is traversing through a receiver's or sender's network (e.g., stacks, linked lists, trees, hash tables, or custom data structures). Any single queue is capable of housing a plurality of network packets being processed through a receiver's or sender's network.

In some embodiments of the invention, the queues are interposed between the Transmission Control Protocol (TCP) stack and the Internet Protocol (IP) stack (when TCP/IP communications are used), such that when a network packet completes routing through its assigned queues defined by the packet's priority, the network packet is released from the IP stack to the TCP stack whereupon an acknowledgment (ACK) is sent from the receiver to the sender. The ACK serves as a notice to the sender to send another packet. In this way, the management of the network packet through its assigned queues will shape the transmission rate of the sender (referred to as "rate shaping"). This permits the receiver to control the sender in manners that conform to the priorities being managed by the receiver and further improves network traffic management, since the receiver is not continually addressing network packets during processing cycles where the receiver does not yet need or desire any additional network packets.

In another embodiment, a sender manages network packets that it is sending to a receiver. The sender assigns network packets for transmission to a sender to its assigned queues. Once the network packets successfully traverse the queues it is released and sent to a receiver. Thus, not only can the receiver control its receive packets for purposes of controlling transmission rates of the sender, but the sender can also use hierarchical queues of priority for controlling when it actually sends network packets to receivers.

In one embodiment of this invention, the techniques presented herein for managing network traffic are implemented in the Nterprise® Branch Office product, distributed by Novell, Inc., of Provo, Utah. However, the teachings of the invention can be integrated and implemented in existing network protocols, custom-developed network protocols, or other network appliances or applications that are designed to manage network data transmission in the manners defined herein and below. All such implementations are intended to fall within the scope of the invention.

FIG. 1 illustrates a flowchart of one method 100 used for managing network traffic using multiple constraints. The method can be implemented in one or more software applications, firmware modules, hardware devices, or combinations of the same. The method's 100 processing is designed for managing network traffic being received from a sender over a network or being sent from a sender over a network. The processing of the method 100 represents the actions taken by a receiver or a sender, within a receiver's or sender's network. A receiver receives network packets from a sender. A sender sends network packets to a receiver. Upon conclusion of the processing, the receiver transmits an acknowledgment (ACK) back to the sender and the receiver forwards the network packet to its destination. Alternatively, upon conclusion of the processing, a sender transmits a network packet associated with its prioritized network traffic to a receiver.

At 110 a network packet is received from a sender over a network or a network packet is received or processed by a sender. Receipt can be via any network protocol or combination of protocols, such as TCP/IP, Hypertext Transfer Protocol (HTTP), HTTP over Secure Sockets Layer (SSL) (HTTPS), and the like. The network packet includes metadata that has a variety of information about the packet, some of this information includes, but is not limited to, a packet number, a sender identification, a destination identification, a data content type, packet byte size, and the like. The processing of the method 100 uses this metadata for identifying the network packet at 120 and assigning a priority to the network packet.

One example technique for assigning or acquiring the priority, is to have a data table that is indexed based on one or more of the metadata elements, such as on destination identification and sender or receiver identification. Once indexed into the data table a priority for the packet is acquired. In another embodiment, the metadata of the network packet may include a specific priority. This latter embodiment may be useful when the sender or receiver is permitted to assign priorities to its own packet transmissions or when the sender or receiver is supplied a priority during initial communication with the sender or receiver.

Or course a variety of techniques can be used to assign or acquire a priority for a received network packet. One of ordinary skill in the art is readily aware of other techniques. Accordingly, all such priority assigning techniques are intended to fall within the scope of the embodiments of this invention.

At 130, the priority assigned to the network packet identifies a plurality of constraints associated with routing the packet through the processing of the method 100 to its desired destination. Again, the constraints can be represented as policies mapped to available priorities and acquired in a variety of manners, such as through indexing a table with a given priority in order to acquire a list of constraints.

At 132, each constraint assigned to the network packet is associated with a separate intermediate holding queue. These queues can independently house and manage a plurality of network packets. Each cell of the queue houses a network packet. In some embodiments, each queue is managed on a first in and first out basis. Thus, network packets receive processing attention based on how long they have been in the queue. In other embodiments, each queue includes its own management applications that can reorder network packets within the queue based on local priorities associated only with the local queue.

At 134, each set of queues assigned to the network packet is logically organized as a path for the network packet to traverse. In some embodiments, this path forms a hierarchy, such that a network packet traverses the hierarchy as it exits one queue and enters the next queue of the hierarchy. Each queue includes its own constraints and management for exiting and traversing a next link to a next queue. The network packet traverses through its entire path or assigned queues before being released to its destination.

In one embodiment for a receiver that embodies the processing of the method 100, the queues are implemented between an IP stack layer and a TCP stack layer of the receiver when TCP/IP communications are used. In these embodiments, the sender expects an ACK for each packet sent before transmitting a next packet. The TCP stack layer automatically sends the ACK when it receives the network packet. The queues in the IP stack layer at the receiver act as a rate shaper for the sender and control the release of the network packet to the TCP layer. The control is based on the constraints defined by each of the queues and the queues are determined based on the network packet's assigned priority. In this way, the sender is forced to conform to the transmission rate which the processing of the method 100 desires based on the constraints associated with the network packet.

In another embodiment for a sender that embodies the processing of the method 100, the queues are implemented between an IP stack layer and a TCP stack layer of a sender when TCP/IP communications are used. The TCP stack layer sends packets to the queues, which control the forwarding of these packets to the IP layer. In this way, the sender conforms to the transmission rate which the processing of the method 100 desires based on the constraints associated with the network packet.

At 140, once the queues are linked together to form a network packet path, the network packet is immediately forwarded to the first queue of that path. Once in the first queue, the network packet will not be released until at 150 it is determined that the constraint that defines the first queue is satisfied. When the constraint is satisfied, at 160, the network packet is released to the next queue of the network packet path. This process continues until at 170 the last queue of the network packet path is satisfied. At this point, the network packet is forwarded to its destination and an ACK is sent back to the sender of the network packet at 180 in the case where a receiver deploys the processing of the method 100. The ACK informs the sender that it is okay to transmit another packet, thus the processing of method 100 rate shapes the transmission rates of the sender.

Alternatively, at 180, in cases where the processing of the method 100 represents a sender, the network packet is released and sent to the receiver. For this particular embodiment, the processing of the method 100 terminates (e.g., when a sender is deploying the processing of the method 100).

Additionally, in some embodiments, at 162, before the network packet is released to a next queue of the network packet path a variety of local or global constraints can be enforced in addition to the constraint defined by any particular queue. For example, each queue may force a network packet to remain in the queue for a defined period of elapsed time. Alternatively, when the last queue is reached a global constraint can require that the network packet be delayed within all the queues for a defined period of elapsed time. Thus, additional constraint hierarchies can be enforced on each of the individual queues or on top of the entire logical queue hierarchy assembled for the network path. Delays may be desirable when there is a need to restrict bandwidth for the network path based on other activity occurring or based on the priority of the network packet.

As one example as to how method 100 can operate, consider an enterprise where each functional group is allocated a certain amount of bandwidth for use within the enterprise's network. For example an enterprise training group may distribute learning materials every day to the enterprise's employees while at the same time a marketing group performs daily web updates for enterprise marketing information. In addition to these constraints, the training group requires its materials to be multicast across the enterprise network and the marketing group requires its updates to be available in network cache by a defined time each morning.

With the present example traditional rate shaping solutions will not be very useful, since a single queue will not adequately handle the multiple constraints of each functional group of the enterprise. With the teachings of the present invention, each group's transactions are assigned a priority that maps to multiple constraints. Thus, the marketing group may receive a priority of 1 and have constraints for a desired bit rate and for a time constraint. The training group receives a priority of 2 that maps to constraints for a different bit rate and a constraint for time. As the applications for the two groups begin to process and transmit packets, the packets are identified along with their priorities and the constraints acquired, packets are not released from the constraint queues until the constraints are met. In addition, overall global constraints can be enforced on top of each of the independent constraint queues for each of the separate network packets traversing through the network. Conventionally, a single queue would manage each of the two groups, resulting in less than optimal performance and complex management. However, this is allowed with the teachings of this invention because multiple queues can be used in a hierarchical fashion to manage multiple priorities and constraints.

In some embodiments, a single network packet may include multiple constraints that occur at the same level of a single hierarchy or at the same or different level of multiple hierarchies. This may occur when a particular network packet includes optional paths or exclusive constraint conditions. In these embodiments, a single network packet can have multiple network paths through the same queue hierarchy or through different queue hierarchies. When this occurs, a single network packet can be submitted in parallel at a branching point for purposes of simultaneously and concurrently traversing two or more network packet paths. Essentially, copies of the network packet are made at path branching points and the packet supplied to each respective queue. Once one of the copies exits a last queue of its path, the remaining copies are removed from their respective queues. In this way, the network packet need not in all cases traverse its queues in a serial manner, since in some instance more complex constraints may make it advantageous to permit the network packet to traverse multiple queues in parallel.

The processing of the method 100 permits multiple constraints to be associated with network packet priorities and permits each of the individual constraints to be managed better than what has been conventionally available. This is so because multiple priorities can be represented as multiple constraints and each constraint defined by a specific queue. Additional constraints can be added to entire hierarchies of queues, such that complex network priorities are better depicted and accounted for with the teachings of this invention. Conventionally, this has not been the case, since priorities were managed as single one dimensional queue which did not take into account multiple dependencies and constraints that were actually needed to manage network traffic.

It is to also be understood, that the teachings of the method 100 can be deployed in a proxy that can act as both a sender and receiver for clients of a network. In these particular embodiments, the proxy sends and receives (sender and receiver) on behalf and for the clients. Thus, in some cases, a single device (proxy) can manage network traffic for a plurality of other devices (clients) and that single device can deploy the processing of the method 100 when it is acting as a sender for a particular client and when it is acting as a receiver for a particular client. It may also be that the proxy only acts as a sender or as a receiver for a particular client.

Figure 2:
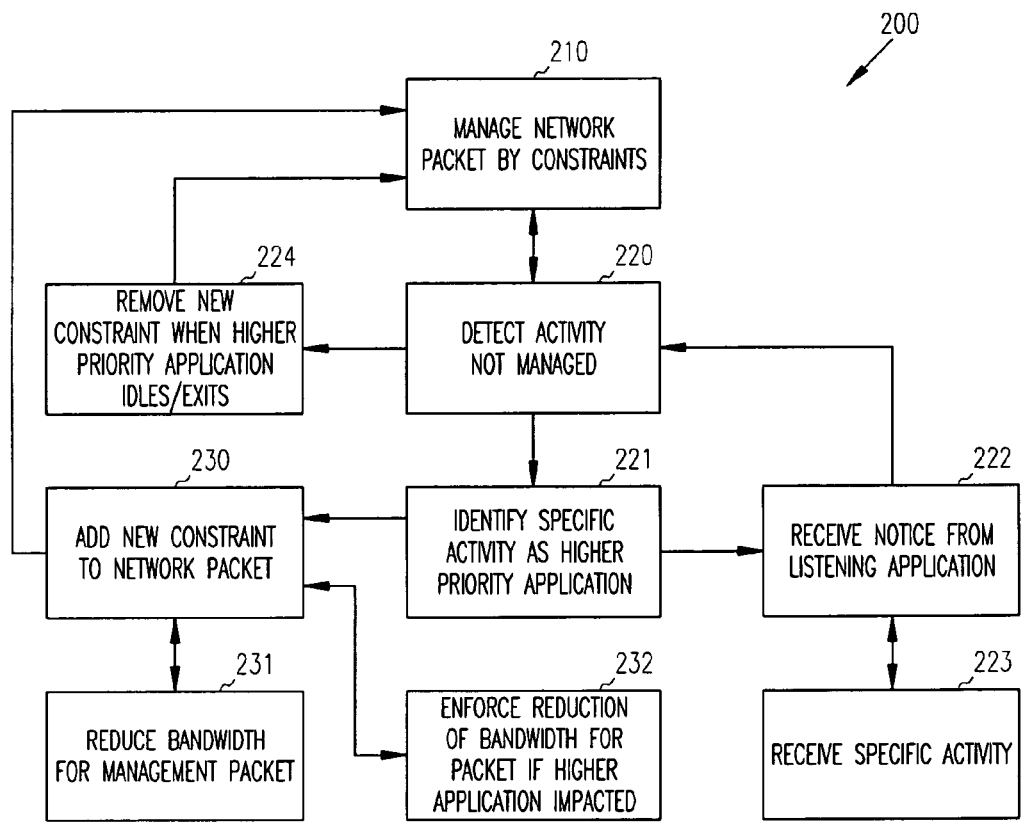
FIG. 2 is a flowchart representing another method for managing network traffic by multiple constraints.

FIG. 2 is another method for another method 200 for managing network traffic by multiple constraints. Again, the processing of the method 200 represents processing performed within a receiver's or sender's network during a network transaction where a sender or receiver is transmitting network packets to the receiver's or sender's network. The processing of the method 200 is implemented within hardware, software, or combinations of hardware and software. Moreover, the processing of method 200 augments the processing depicted in the method 100 of FIG. 1 in order to further enhance the management of network traffic.

At 210, the processing of the method 200 manages network packets being received from a sender or being planned to be sent to a receiver, in manners similar to what was discussed above with the embodiments of FIG. 1. That is, when a sender sends a network packet or prepares to send a network packet, the packet is assigned a priority, constraints are determined, queues are linked together to form a network packet path, and the network packet traverses the path until all constraints are satisfied whereupon an ACK is sent (e.g., receiver is deploying the processing of the method 200) to the sender and the network packet is forwarded to its destination. Alternatively, when a sender deploys the processing of the method 200, after the packet exits the path it is transmitted to a receiver.

Yet, as was mentioned above, there are many instances where there may be network activity occurring on a receiver's or sender's network where that activity is not directly under the control of the processing of the method 100 or the method 200. The embodiments of FIG. 2 are intended to address this problem.

Accordingly, at 220, the processing of the method 200 detects activity that is occurring within the receiver's or sender's network that is not directly under the management control of the method 200. In addition, at 221, that activity is identified as being associated with a higher priority application. A higher priority application is one that has a higher priority than the network packets being directly managed by the processing of the method 200.

One technique for detecting activity of a higher priority application is to develop customized listening applications that are designed to look for specific types of activity occurring on the receiver's or sender's network.

These listening applications can be designed to listen on a variety of different shared and non-shared network interface types (e.g., Asynchronous Transfer Mode (ATM) interfaces, Gigabit Ethernet (GigE) interfaces, Frame Relay (FR) interfaces, Time-Division Multiplexing (TDM) interfaces, Fiber Distributed Data Interface (FDDI), Integrated Services Digital Network Interfaces (ISDN), Synchronous Optical Network (SONET), and others). In addition, these listening applications can be designed to listen on predefined network ports or dynamically defined network ports, and can be designed to listen for specific types of activity of higher priority applications (e.g., detecting certain urgent operations of a specific application).

These listening applications are often referred to as "sniffers" and are well known to those of ordinary skill in the art. Moreover, some network media interfaces, such as Ethernet, provide off-the-shelf tools to create listening applications.

The listening applications can perform a variety of operations to assist the processing of the method 200. For example, at 222, a listening application can notify the processing of the method 200 that a specific higher priority application is currently active and processing in the receiver's or sender's network. A listening application at 223 can also be designed to identify specific activity that a higher priority application is performing within the network.

In addition, at 224, when a listening application determines that a higher priority application has idled or exited any new constraint that was being enforced because of higher priority activity can be removed from the management of network packets at 210. That is, a listening application can be configured to detect when a higher priority application goes idle by detecting that no activity (no network packets) is occurring with the higher priority application within a predefined period of time. Essentially, during processing cycles of the listening application if the no activity is detected, the listening application sets a timer and when the timer expires if there is still no activity then the listening application determines the higher priority application is idle and properly notifies the processing of the method 200.

The listening applications can also determine when a higher priority application has exited or finished processing. One technique for doing this when TCP communications are being used is to look for TCP SYN (start) and FIN (finish) packets being used with the higher priority application. Detecting when a higher priority application is finished is advantageous when the higher priority application is not an interactive application, such as email, that continually runs within the receiver's or sender's network. Interactive applications are best monitored for idle periods, since there are often many long lulls between processing cycles for these types of applications. Of course, a single listening application can be designed to detect idle periods and conditions that indicate an application has exited or finished processing.

At 230, if activity associated with a higher priority application is detected, then at 230 the processing of the method 200 takes some additional action, such as adding a new constraint to the management of the network packets being managed at 210. One new constraint might be to reduce the bandwidth available to the managed network packet at 231. This can be achieved by slowing the traversal of the managed network packet through its network queue path. In some embodiments, the managed network packet can be completely idled within one of its queues until instructed to proceed. In other embodiments, the management network packet can be throttled back by a defined and configurable percentage of increased elapsed time within its queues.

New constraints need not always be reductions in bandwidth, for example it may be advantageous to only throttle the bandwidth back for the managed network packet if another activity is detected in combination with the detected activity. Of course there are a variety of other types of constraints that can be added in the proper circumstances and all such new constraints are intended to fall within the scope of this disclosure.

In some embodiments, the detection of higher priority activity need not necessarily result in a new constraint being enforced against the managed network packet. For example, the higher priority activity may not be impacted by the management of the managed network packet. This may occur when there are large amounts of under utilized bandwidth within the receiver's or sender's network. Thus, in some embodiments, at 232, bandwidth reduction can be enforced against the managed network packet only when it is determined that the higher priority activity is being imaged by the management of the managed network packet.

One technique for making this determination is to listen for packets being dropped or not acknowledged with the activity of the higher priority application. If packets are not dropped and acknowledgments are occurring normally, then there is no need to throttle back the bandwidth of the managed network packet. Moreover, in some embodiments, a single dropped packet or failed acknowledgment may not render a condition that a network administrator deems significant enough to throttle back the bandwidth of the management network packet. Thus, the level of impact to the higher priority application's activity can be used as a configuration parameter based on the desires and needs of a network.

Embodiments of the method 200 demonstrate how external activity which is not being directly managed by the processing of the method 200 can be monitored and used to alter bandwidth for a receiver's or sender's network in order to accommodate higher priority activity. This is particularly useful where the processing of the method 200 is implemented within a CDN and activity occurring outside the scope of the CDN is properly accounted for with the added improvements embodied by the processing of the method 200.

Figure 3:
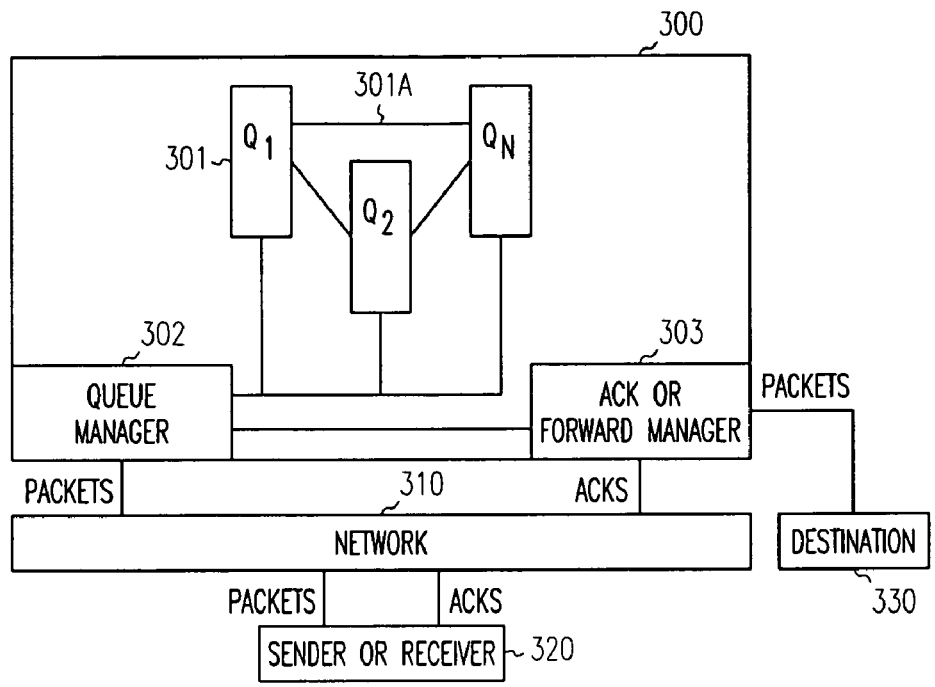
FIG. 3 is a diagram of a system for managing network traffic by multiple constraints.

FIG. 3 is a diagram of a system 300 for managing network traffic by multiple constraints. The system 300 is implemented in a computer readable medium within hardware, software, or a combination of hardware and software of a receiver's or sender's network. In one embodiment, the system 300 is interposed between the IP stack layer and TCP stack layer of TCP/IP communication systems. The system 300 manages network packets received from a sender 320 over a network 310.

The system 300 includes a plurality of queues 301 and a queue manager 302. The queues 301 hold network packets that are sent from a sender 320 and destined for a specific destination 330. Each queue 301 is capable of housing multiple network packets from multiple senders 320. Moreover, each queue 301 maps to a defined constraint. A constraint can be resource based, time based, or bandwidth based. A constraint must be satisfied for a network packet before it can exit the queue 301 associated with that particular constraint.

The queue manager 302 logically groups a selective number of the queues 301 together for each network packet. These groupings form a single path or multiple alternative paths for each network packet to traverse through the system 300 to its destination 330. The paths include links 301A for transitioning from one queue 301 of the path to a next queue 301 of the path. In some embodiments, the links 301A can also include their own priorities for permitting network packets to traverse to a next queue 301.

During operation of the system 300, if implemented in a receiver, the queue manager 302 receives a network packet over the network 310 from a sender or receiver 320. If implemented in a sender, the queue manager 302 receives the network packet locally. The metadata of the packet is inspected to acquire the identity of the sender or receiver 320 and other information that permits the queue manager 302 to determine a proper priority for the received network packet. The priority permits the queue manager 302 to look up or determine the proper constraints for the network packet which map to specific queues 301. The priority also permits the queue manager 302 to form one or more paths through the queues 301 for the network packet to traverse.

The network packet is then inserted into a first queue 301 of the formed queue path. Next, the network packet traverses each link 301A of its defined path to successive queues 301 from the first queue 301 until it exits a last queue 301. The network packet is not permitted to traverse a link to a next queue 301 until the constraint associated with the network packet's current queue 301 is satisfied.

In some embodiments, the network packet traverses a single path defined by the queue manager 302 in a serial manner. In other embodiments, the queue manager 302 generates a plurality of paths for a single network packet. In these latter embodiments, when a network packet reaches a branching point in a path where two or more separate paths are available, the network packet is copied and submitted to all of the available paths in parallel. When one copy of the network packet exits a last queue associated with the path that it was traversing, the remaining copies of the network packet are removed from their respective queues. Thus, the queue manager 302 can provide multiple paths through the queues 301 for any single network packet.

When a network packet exits a last queue 301 of its path, the queue manager 302 notifies an ACK and forward manager 303, in cases where the system 300 is being used by a receiver. The ACK and forward manager 303 sends an ACK back over the network to the original sender 320 of the network packet and forwards the network packet to its defined destination 330. When the sender 320 receives the ACK it will then send a next packet, if one is available. Thus, the processing of the system 300 not only provides a technique for processing multiple constraints associated with more complex or multiple priorities, but the system 300 also adjusts the transmission rate of the sender 320 in order to control the sender 320 in a manner that conforms to the multiple constraints being managed by the system 300.

In cases where the system 300 is being used by a sender, when a network packet exits a last queue 301 of its path, the queue manager 302 notifies a forward manager 303. The forward manager 303 sends the network packet to an IP stack layer of the sender. The IP stack layer then transmits the network packet to a receiver 320.

It is also to be understood, that the system 300 can be used by a proxy that acts as both a sender and a receiver on behalf of other network 310 clients. The proxy can in some cases act as only a sender or act as only a receiver. Additionally, the proxy can act as both a sender and a receiver as was stated above.

Figure 4:
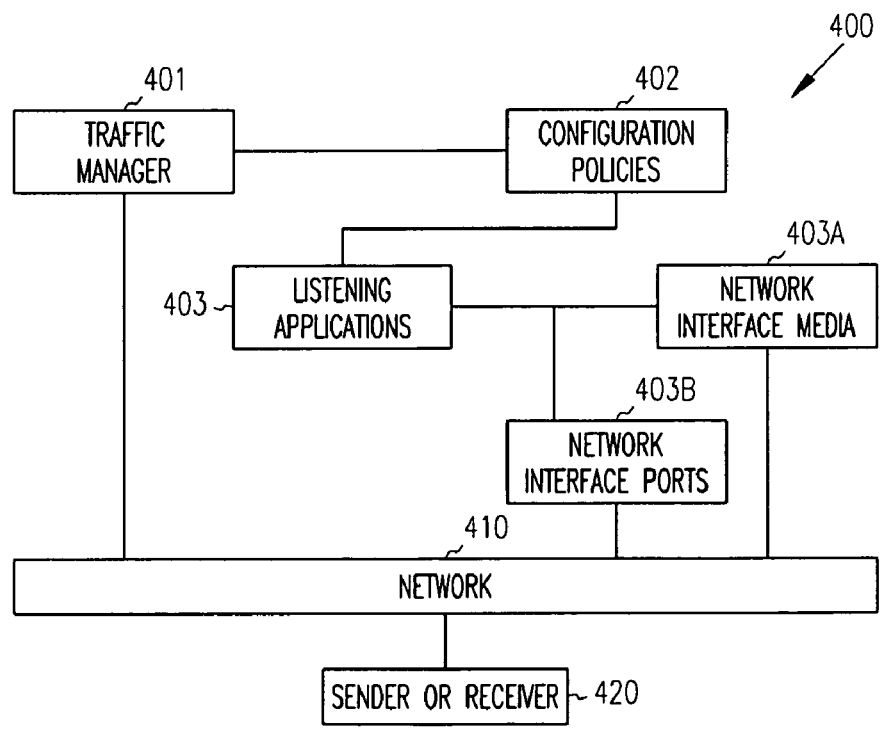
FIG. 4 is a diagram of another system for managing network traffic by multiple constraints.

FIG. 4 is a diagram of another system 400 for managing network traffic by multiple constraints. The system 400 is implemented in a computer readable medium and is used for managing network traffic. The system 400 can be implemented in hardware, software, or a combination of hardware and software. Further, the system 400 is operational within a receiver's or sender's network. For a receiver implementation, a sender 420 sends network packets over a network 410 to the system 400. For a sender implementation, the sender sends network packets to its TCP stack layer for processing to the IP layer and ultimately for transmission to a receiver 420. In another embodiment, the system 400 is implemented in a proxy that acts as both a sender and receiver for network clients. These packets are managed with techniques described with the embodiments of system 300 described above in FIG. 3. However, the system 400 augments the processing of system 300 in the following manners.

The system 400 includes a traffic manager 401, configuration policies 402, and listening applications 403. The traffic manager 401 performs operations similar to that of system 300 of FIG. 3 and also performs additional operations described herein and below. That is the traffic manager 401 manages network packets received from a sender or receiver 420 over a network 401 by using multiple constraints defined by multiple queues 301 of FIG. 3.

The configuration policies 402 define higher priority applications that may generate network traffic within the system 400 and which are not directly controlled by the traffic manager 401. The configuration policies 402 include identifiers for these higher priority applications and include actions for the traffic manager 401 to take when the traffic manager 401 receives notice of their existence or their activity. The configuration policies 402 can be embedded in network tables, data stores, or files. Alternatively, the configuration policies can be embedded with the traffic manager 401 or the listening applications 403.

The listening applications 403 are designed to look for activity or traffic on the system 400 that is associated with higher priority applications defined by the configuration policies 402. In some embodiments, each unique listening application 403 is designed to listen on specific network interface ports 403B for activity of a higher priority application defined in a particular configuration policy 402. In more embodiments, some listening applications 403 are designed to listen for activity occurring that uses specific network interface media 403A. In still other embodiments, some listening applications 403 are designed to be application specific. That is some listening applications 403 have the ability to detect certain operations that are being performed by specific higher priority applications.

The listening applications 403 notify the traffic manager 401 when activity is detected that is defined in the configuration policies 402. When the traffic manager 401 receives these notices, the traffic manager 401 inspects the appropriate configuration policies 402 to acquire the appropriate actions to take based on the received notices.

In some embodiments, the listening applications 403 are designed to not send notice to the traffic manager 401, if the listening applications 403 detect that the activity of the higher priority application is not being impacted by the management of the traffic manager 401. In other embodiments, the listening application 403 sends notices in all cases where activity is detected and the traffic manager 401 makes a determination as to whether to add a new constraint to a particular network packet or to hold off on adding any additional constraint based on no substantial impact to the higher priority application. In these latter embodiments, the listening application 403 would also notify the traffic manager 401 of any impacts in lost packets or failed ACKS that are occurring with the higher priority application (when the system 400 is deployed within a receiver).

Actions can include adding additional constraints to one or more of the network packets being managed by the traffic manager 401 or can include waiting for another type of notice before adding any additional constraints. Thus, some actions instruct the traffic manager 401 to throttle back the bandwidth allocated to one or more of the constraints. This can be achieved by increasing time delays for the affected network packets to be released from there respective queues. The time delay will impact the available bandwidth available to the affected network packets and can be configured to be a percentage or can be infinite until the traffic manager 401 modifies it.

The listening applications 403 can also be configured to send notices to the traffic manager 401 when it detects that a higher priority application has become idle or has exited processing. This permits the traffic manager 401 to remove any added constraints to affected network packets when the network condition indicates that it is appropriate to do so.

System 400 permits the system 300 to be augmented in order to account for network activity that is not within the direct control of system 300 and is of higher priority than the traffic being managed by system 300. Thus, multiple constraints and more complex priorities are better managed without impacting traffic of higher priority that is not being directly managed. Moreover, by controlling when ACKs are sent back to senders 420 the techniques presented allow for controlling the senders' 420 transmission rates (when the system 400 is deployed in a receiver). This further improves operational performance of systems 300 and 400 because the senders 420 are conditioned to send network packets at transmission rates that are expected and needed by systems 300 and 400 during their management of network traffic.

Although specific embodiments have been illustrated and described herein, one of ordinary skill in the art will appreciate that any arrangement calculated to achieve the same purpose can be substituted for the specific embodiments shown. This disclosure is intended to cover all adaptations or variations of various embodiments of the invention. It is to be understood that the above description has been made in an illustrative fashion only. Combinations of the above embodiments, and other embodiments not specifically described herein will be apparent to one of ordinary skill in the art upon reviewing the above description. The scope of various embodiments of the invention includes any other applications in which the above structures and methods are used. Therefore, the scope of various embodiments of the invention should be determined with reference to the appended claims, along with the full range of equivalents to which such claims are entitled.

It is emphasized that the Abstract is provided to comply with 37 C.F.R. §1.72(b), which requires an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in single embodiments for the purpose of description. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. The following claims are hereby incorporated into the Detailed Description, with each claim standing on its own as a separate preferred embodiment.

What is claimed is:

1. A method to manage network traffic by multiple constraints, the method implemented in a computer-readable storage medium and adapted to process on a hardware device and comprising:

identifying constraints associated with a network packet;

assigning the network packet to a plurality of queues;

forwarding the network packet to a first one of the queues; and releasing the network packet to each successive queue as a number of the constraints is satisfied, wherein each distinct one of the constraints is associated with a particular one of the queues and each distinct one of the constraints is used to control exiting of the network packet through each queue to which it is associated an on to a next one of the remaining queues, and wherein each queue has local priorities for that particular queue that permit the network packet and other packets within that particular queue to be reordered within that particular queue in response to the local priorities for that particular queue;

adding a new constraint for managing the network packet while the network activity remains at a higher priority thereby slowing traversal of the network packet through a queue path associated with the queues;

listening applications that listen for activity of the higher priority applications associated with the configuration policies and notify the traffic manager when activity is detected to thereby slow the progression of the network packets through the queue path in view of the higher priority applications.

2. The method of claim 1 further comprising linking each of the queues together based on the constraints.

3. The method of claim 2 wherein the linking further includes forming a hierarchical queue path for the network packet to pass through based on the linking of each of the queues.

4. The method of claim 1 further comprising delaying the releasing of the network packet to each of the successive queues until desired periods of time have elapsed, wherein each queue includes its own desired period of time.

5. The method of claim 1 further comprising delaying the releasing of the network packet from a last queue until a desired global period of time has elapsed.

6. The method of claim 1 wherein the identifying the constraints further includes representing constraints as at least one of bandwidth limits, time limits, and resource limits associated with the network packet and each constraint is assigned to a specific one of the queues.

7. The method of claim 1 wherein the releasing further includes releasing the network packet as more than one copy and in parallel to more than one of the successive queues as a number of the constraints are satisfied for a number of the queues.

8. The method of claim 1 wherein the processing is implemented in at least one of a sender, a receiver, and a proxy acting as both the sender and the receiver.

9. The method of claim 1 wherein the processing is implemented in a receiver and the receiver sends an acknowledgment to a sender of the network packet after the network packet has passed through all of the queues.

10. A method to manage network traffic by multiple constraints, the method implemented in a computer-readable storage medium and adapted to process on a hardware device and comprising:

managing a network packet by multiple constraints, wherein each constraint is associated and assigned to a different queue that the network packet traverses through before being released over the network and each distinct one of the constraints is used to control exiting of the network packet from a particular queue having the network packet to a next queue;

detecting network activity not being managed;

identifying the network activity as being associated with a higher priority application; and wherein each queue has local priorities for that particular queue that permit the network packet and other packets within that particular queue to be reordered within that particular queue in response to the local priorities for that particular queue; and adding a new constraint for managing the network packet while the network activity remains at a higher priority thereby slowing traversal of the network packet through a queue path associated with the queues; and listening applications that listen for activity of the higher priority applications associated with the configuration policies and notify the traffic manager when activity is detected to thereby slow the progression of the network packets through the queue path in view of the higher priority applications.

11. The method of claim 10 wherein the detecting further includes receiving notice of the network activity from a listening application which provides an identity for the higher priority application.

12. The method of claim 11 further comprising receiving a specific activity from the listening application that identifies operations being performed by the higher priority application.

13. The method of claim 10 further comprising removing the new constraint for managing the network packet when the network activity idles and a configurable period of time has elapsed where no activity is detected.

14. The method of claim 10 wherein adding the new constraint further includes reducing bandwidth used for managing the network packet.

15. The method of claim 10 wherein adding the new constraint further includes enforcing a reduction in bandwidth for managing the network packet if the network activity is impacted by managing the network packet.

16. The method of claim 10 wherein in adding the new constraint further includes reducing bandwidth for managing the network packet by a configurable percentage based on a priority level associated with the higher priority application.

17. A system to manage network traffic by multiple constraints, and implemented in a computer-readable storage medium and adapted to process on a hardware device and comprising:
   a plurality of queues each associated with a separate constraint, wherein each distinct constraint is associated to a particular one of the queues and each distinctive constraint controls exiting of network packets through that distinctive constraint's queue, and wherein each queue has local priorities for that particular queue that permit the network packets within that particular queue to be reordered within that particular queue in response to the local priorities for that particular queue; and
   a queue manager that assembles sets of the queues into hierarchies for received network packets based on identities associated with the network packets, and wherein the packets traverse the hierarchies after satisfying the constraints of the queues and once traversed the network packets are forward to their destinations; and
   adding a new constraint for managing the network packet while the network activity remains at a higher priority thereby slowing traversal of the network packet through a queue path associated with the queues; and
   listening applications that listen for activity of the higher priority applications associated with the configuration policies and notify the traffic manager when activity is detected to thereby slow the progression of the network packets through the queue path in view of the higher priority applications.

18. The system of claim 17 wherein the system is implemented in at least one of a receiver, a sender, and a proxy acting as both the sender and the receiver.

19. The system of claim 17 wherein a number of the network packets traverse their respective hierarchies as multiple copies and in parallel to one another and once a first copy completely traverses its respective hierarchy the remaining copies are removed from their respective hierarchies.

20. The system of claim 17 wherein a number of the network packets serially traverse their respective hierarchies.

21. The system of claim 17 wherein the queue manager assembles the hierarchies by linking selective queues together and wherein each link represents a traversal within one of the hierarchies.

22. The system of claim 21 wherein each link is associated with a priority.

23. A system to manage network traffic by multiple constraints and implemented in a computer-readable storage medium and adapted to process on one or more hardware devices, comprising:
   a traffic manager that manages network packets by multiple constraints, wherein each constraint is assigned to a particular queue and each distinct constraint controls exiting of the network packets through that distinct constraint's queue to a next queue within queue path that the network packets traverse;
   configuration policies that identify higher priority applications that generate network traffic which is not controlled by the traffic manager, wherein the configuration policies include actions for the traffic manager to take when the higher priority applications are active; and
   wherein each queue has local priorities for that particular queue that permit the network packet and other packets within that particular queue to be reordered within that particular queue in response to the local priorities for that particular queue; and
   adding a new constraint for managing the network packet while the network activity remains at a higher priority thereby slowing traversal of the network packet through a queue path associated with the queues; and
   listening applications that listen for activity of the higher priority applications associated with the configuration policies and notify the traffic manager when activity is detected to thereby slow the progression of the network packets through the queue path in view of the higher priority applications.

24. The system of claim 23 wherein each of the listening applications is assigned to listen for the activity on a defined network port.

25. The system of claim 23 wherein each of the listening applications is associated with a specific network interface media.

26. The system of claim 23 wherein a number of the listening applications detect specific types of operations being performed by the applications.

27. The system of claim 23 wherein a number of the listening applications detect when activity of the higher priority applications becomes idle and notifies the traffic manager to suspend any actions that were being enforced while the higher priority applications remain idle.

28. The system of claim 23 wherein a number of the listening applications do not notify the traffic manager when activity is detected if the activity is not impacted by the traffic manager's management of the network packets.

29. The system of claim 23 wherein a number of the actions instruct the traffic manager to reduce bandwidth allocation for the network packets by a percentage.

30. The system of claim 23 wherein a number of the listening applications detect when a number of the higher priority applications exit processing and notify the traffic manager to suspend any actions being enforced.

* * * * *